INVENTORS
Georg Salomon Jonsson
Karl Östen Ingvar Andersson

BY *Pierce, Scheffler & Parker*
ATTORNEYS

United States Patent Office 3,511,994
Patented May 12, 1970

---

3,511,994
NEUTRON DETECTOR HAVING A STANDARD BETA SOURCE FOR PRODUCING A CONTINUOUS CHECK CURRENT
Georg Salomon Jonsson and Karl Osten Ingvar Andersson, Nykoping, Sweden, assignors to Aktiebolaget Atomenergi, Stockholm, Sweden, a Swedish company
Filed May 26, 1967, Ser. No. 641,631
Int. Cl. G01t 3/00
U.S. Cl. 250—83.1                              3 Claims

ABSTRACT OF THE DISCLOSURE

The invention is concerned with a neutron detector containing an emitter emitting beta radiation when irradiated with neutrons, and a collector for the beta particles. The beta radiation creates an electric current. The improvement consists in providing a radioactive substance which emits beta particles continuously, thus creating a continuous check current.

---

Figure 1:
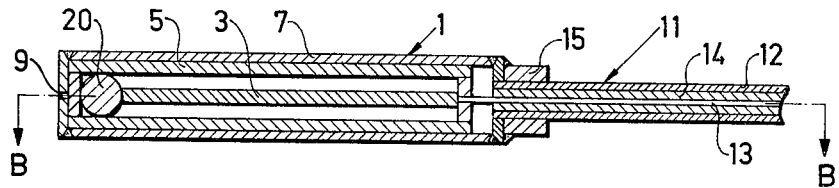

The present invention relates to a detector for measuring a neutron flux by utilizing beta current. It is known that detectors commonly used for measuring the neutron flux in a nuclear reactor comprise a beta current emitter, i.e. an element which on being subjected to neutron radiation changes to a substance which decays during emission of beta rays, a collector against which the emitter creates an electric potential during the beta emission and an insulator arranged between the emitter and the collector. By connecting a current measuring instrument between the emitter and the collector it becomes possible to directly measure a current which is proportional to the neutron flux.

It is also possible for such known neutron detectors to be utilized in other connections for measurement of neutron fluxes of high intensity, where the special advantages of these detectors are of value namely that the detectors are of robust and simple construction and are independent of any external voltage sources. This is especially the case when the neutron flux measurement is combined with an alarm system. However, in such methods it is not only necessary that the operational procedure should be simple but also that there should be facilities for continuous or intermittent tests of the operation of the entire measuring system. It is especially important to be able to execute such operational tests in those cases where the value measured is zero under normal conditions or at all events far below that measurement value at which the system should give an alarm.

A measuring system consisting of a neutron detector of the type stated and a current measuring instrument can suffer from three types of operational fault:
(a) The current measuring instrument may indicate an incorrect value at a given input current; (b) the insulator in the detector or in the cable from the detector to the current measuring instrument may have a too low electrical resistance; and (c) the electrical circuit between the emitter and the current measuring instrument may be broken due to a fracture in the cable.

When carrying out an operational test of system for the purpose of indicating possible faults of the above mentioned types, the main object is to check correct operation by means of a test. Therefore, it is most usual to subject the detector to a predetermined neutron flux during a continuous test period of short test periods, the current measuring instrument then giving a certain defined reading. However, with the above described type of neutron detector this procedure is as a rule very impracticable because the neutron source which would be necessary to generate a current of observable value from the detector of fairly low sensitivity would be expensive and difficult to control.

According to the present invention it has been found that a complete and continuous operational test relating to the aforesaid characteristics of the system can be arranged in a much simpler way by providing a special embodiment of the aforementioned neutron detector. This embodiment is characterized by that a radioactive beta particle emitting source is arranged in association with the emitter to generate a check current in the detector. In a detector according to the invention, a continuous check current is obtained which can be utilized for continuously checking the operation of the detector and the associated current measuring instrument. An alarm is given if the check current fails.

According to one preferred embodiment of the invention, the beta particle emitting source consists of strontium 90 which with a half-life of 28 years changes to yttrium 90 during emission of beta radiation, the yttrium 90 with a half-life of approximately 62 hours decaying to a stable zirconium isotope during the emission of high energy beta radiation. The beta particle emitting source may be capsuled in a capsule of stainless steel, the capsule being conductively connected to the emitter.

The invention will now be more closely described with reference to a preferred embodiment illustrated in the accompanying drawing.

Figure 2:
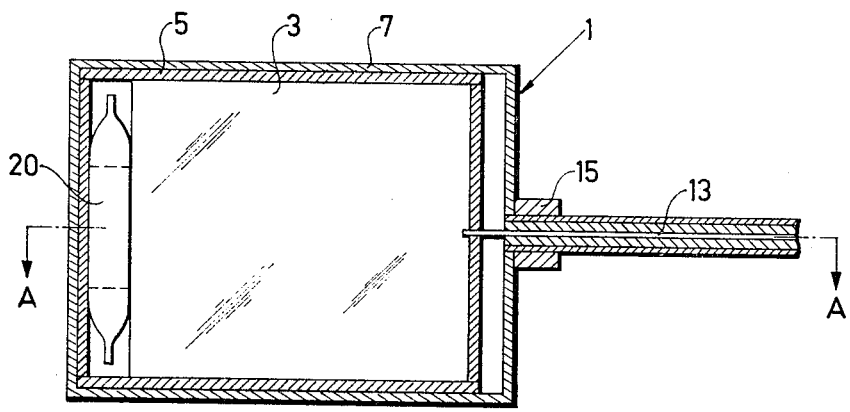
Figure 3:
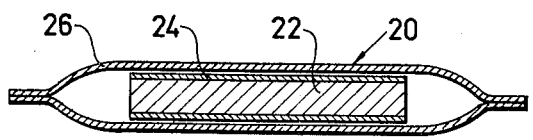

FIG. 1 shows a section through the detector in FIG. 2 taken along the line A—A, FIG. 2 shows a section through the detector in FIG. 1 taken along the line B—B. FIG. 3 shows an enlarged view in section through a beta particle emitting source according to the invention.

The neutron detector shown in the drawing and generally indicated by 1 comprises an emitter 3 consisting of a rhodium plate 50 x 50 x 0.5 mm. which is surrounded by an insulator 5 consisting of aluminum oxide with a thickness of 0.3 mm. The insulator 5 is surrounded by a collector 7 consisting of a casing of stainless steel with a thickness of 0.25 mm. A beta particle emitting source 20 which is described in more detail below is secured to the one end of the emitter 3 by means of spot welding.

At the other end of the detector unit 1 a coaxial cable 11 is connected, the cable comprising an outer casing 12 which encloses an insulating material 14 consisting of $Al_2O_3$ which contains a conductor 13 that is electrically connected to the emitter 3. The coaxial cable 11 is connected to the collector casing 7 through a member 15 which surrounds the cable 11 and is welded to the casing 7. The other end of the cable 11 is connected to an instrument not illustrated for measuring the strength of the current.

FIG. 3 shows the beta particle emitting source 20 in detail in an axial section. The beta particle emitting source contains a central wire 22 of platinum which has a diameter of 0.6 mm., the wire having 5 mc. (millicurie) of strontium 90 precipitated on it in a thin layer 24 by electrolysis. The platinum wire with the strontium coating is capsuled in a tube 26 of stainless steel, the tube having an external diameter of 1.0 mm. and a well thickness of 0.1–0.2 mm. The tube 26 is flattened at both ends and sealed with a gastight weld.

As previously stated the beta particle emitting source 20 is secured to the emitter 3 by means of spot welding. When the detector has been assembled the enclosed moisture is evacuated through an opening 9 (FIG. 1) in the wall of the collector casing 7 by heating the detector, the opening 9 being subsequently sealed.

In brief the operation of the detector is as follows: Due to the beta radiation from the beta particle emitting source 20, a constant current is obtained from the detector, thus making it possible to check the detector continuously, without the necessity of subjecting it to neutron radiation. In the above embodiment the check current is approximately $10^{-11}$ amperes. When the detector is subjected to neutron radiation, for example, during an unintentional criticality in connection with the handling of plutonium solutions, the rhodium emitter changes to an isotope which decays whilst emitting beta radiation which is added to the beta radiation from the beta particle emitting source 20. Because the beta rays pass at least partially through the insulator and are collected or pass through the collector, an electric current is obtained which can be directly read off and comprises a measure of the neutron flux, the current strength being proportional to the neutron flux after the check current has been substracted.

The invention is not, of course, limited to the embodiment described above, it being possible to apply the inventive idea in many other embodiments within the scope of the invention. It is thus possible to vary the material of the various parts of the detector. In addition to rhodium the emitter can be comprised of silver or vanadium and the insulator may consist of $Be_2O_3$, $MgO$, polyethylene or Teflon. Of course the detector can also have a cylindrical form, wherein the emitter, the insulator and the collector are arranged concentrically. In considering the quantity of radio active substance in the beta particle emitting source this quantity can of course be varied within broad limits. In the described embodiments a check current of approximately $10^{-11}$ amps is obtained, this value being suitable in those cases where a signal current of approximately $10^{-10}$ amps can be expected as a result of neutron radiation. Where strontium 90 is concerned the quantity lies within the range of 0.5–50 mc., preferably 1–10 mc., with consideration being given to i.e. the risk of poisoning.

What is claimed is:

1. A neutron detector, comprising an emitter consisting of a material emitting beta radiation on being exposed to neutron radiation, a metallic housing surrounding said emitter and being electrically insulated therefrom, said metallic housing serving as a collector for the beta radiation from the emitter, thus creating an electric potential between the emitter and the collector, a radioactive substance situated in said metallic housing, electrically insulated from said housing and electrically connected to said emitter, said radioactive substance continuously and spontaneously decaying while emitting beta radiation, thus creating a continuous electric check potential between said emitter and said collector, and means for connecting the emitter and the collector to an instrument for measuring said electric potential and said continuous electric check potential.

2. A neutron detector, comprising an emitter consisting of a material emitting beta radiation on being exposed to neutron radiation, a metallic housing surrounding said emitter and being electrically insulated therefrom, said metallic housing serving as a collector for the beta radiation from the emitter, thus creating an electric potential between the emitter and the collector, a radioactive substance consisting of $Sr^{90}$ situated in said metallic housing, electrically insulated from said housing and electrically connected to said emitter, said radioactive substance continuously and spontaneously decaying while emitting beta radiation, thus creating a continuous electric check potential between said emitter and said collector, and means for connecting the emitter and the collector to an instrument for measuring said electric potential and said continuous electric check potential.

3. A neutron detector, comprising an emitter consisting of a material emitting beta radiation on being exposed to neutron radiation, a metallic housing surrounding said emitter and being electrically insulated therefrom, said metallic housing serving as a collector for the beta radiation from the emitter, thus creating an electric potential between the emitter and the collector, a radioactive substance consisting of $Sr^{90}$ in a quantity of 0.5–50 millicurie situated in said metallic housing, electrically insulated from said housing and electrically connected to said emitter, said radioactive substance continuously and spontaneously decaying while emitting beta radiation, thus creating a continuous electric check potential between said emitter and said collector, and means for connecting the emitter and the collector to an instrument for measuring said electric potential and said continuous electric check potential.

References Cited

UNITED STATES PATENTS

| 3,375,370 | 3/1968 | Hilborn | 250—83.1 |
|---|---|---|---|
| 2,648,012 | 8/1953 | Scherbatskoy | 250—71.5 |

ARCHIE R. BORCHELT, Primary Examiner

D. L. WILLIS, Assistant Examiner

U.S. Cl. X.R.

250—83